United States Patent
Conroy et al.

(10) Patent No.: US 11,651,289 B2
(45) Date of Patent: May 16, 2023

(54) SYSTEM TO IDENTIFY AND EXPLORE RELEVANT PREDICTIVE ANALYTICS TASKS OF CLINICAL VALUE AND CALIBRATE PREDICTIVE MODEL OUTPUTS TO A PRESCRIBED MINIMUM LEVEL OF PREDICTIVE ACCURACY

(71) Applicant: KONINKLIJKE PHILIPS N.V., Eindhoven (NL)

(72) Inventors: Bryan Conroy, Garden City South, NY (US); Junzi Dong, Cambridge, MA (US); Minnan Xu, Cambridge, MA (US)

(73) Assignee: Koninklijke Philips N.V., Eindhoven (NL)

(*) Notice: Subject to any disclaimer, the term of this patent is extended or adjusted under 35 U.S.C. 154(b) by 804 days.

(21) Appl. No.: 16/531,189

(22) Filed: Aug. 5, 2019

(65) Prior Publication Data
US 2020/0050892 A1 Feb. 13, 2020

Related U.S. Application Data

(60) Provisional application No. 62/715,841, filed on Aug. 8, 2018.

(51) Int. Cl.
*G06K 9/62* (2022.01)
*G06N 3/08* (2006.01)
*G06N 20/00* (2019.01)

(52) U.S. Cl.
CPC ......... *G06K 9/6256* (2013.01); *G06K 9/6262* (2013.01); *G06N 3/08* (2013.01); *G06N 20/00* (2019.01)

(58) Field of Classification Search
None
See application file for complete search history.

(56) References Cited

FOREIGN PATENT DOCUMENTS

WO 2017216137 A1 12/2017

OTHER PUBLICATIONS

Zhang S, Zhai J, Chen J, He Q. Autoencoder and its various variants. In 2018 IEEE International Conference on Systems, Man, and Cybernetics (SMC) Oct. 7, 2018 (pp. 415-419). IEEE. (Year: 2018).*
Berndt, D.J. et al., "A Case Study of Data Quality in Text Mining Clinical Progress Notes". ACM Transactions on Information Systems, Feb. 2015.

* cited by examiner

*Primary Examiner* — Vincent Gonzales

(57) ABSTRACT

A method of implementing a task complexity learning system, including: learning a model for predicting the value of a continuous task variable y based upon an input variable x; learning an encoder that encodes a continuous task variable y into an encoded task value; calculating a loss function based upon the predicted value of y output by the model and the encoded task value output by the encoder; calculating a distortion function based upon the input continuous task variable y and the encoded task value, wherein learning the model and learning the encoder includes minimizing an objective function based upon the loss function and the distortion function for a set of input training data including x, y pairs.

17 Claims, 3 Drawing Sheets

SYSTEM TO IDENTIFY AND EXPLORE RELEVANT PREDICTIVE ANALYTICS TASKS OF CLINICAL VALUE AND CALIBRATE PREDICTIVE MODEL OUTPUTS TO A PRESCRIBED MINIMUM LEVEL OF PREDICTIVE ACCURACY

TECHNICAL FIELD

Various exemplary embodiments disclosed herein relate generally to a system to identify and explore relevant predictive analytics tasks of clinical value and calibrate predictive model outputs to a prescribed minimum level of predictive accuracy.

BACKGROUND

The problem of developing predictive clinical decision support algorithms in healthcare is often posed as a supervised learning problem in which a well-defined target variable of interest is to be predicted from a candidate set of features. Depending on the target variable being discrete or continuous, a classifier or regression model is learned from a set of training data.

In order to commercialize a clinical decision support tool, the model must achieve a certain minimum level of accuracy. This level of accuracy may not be achievable for a given target task (e.g., a suitable regression model could not be found to predict a physiological measurement from other measures of patient state to a tolerance of +/−0.05 with 95% confidence). Despite this, it may be possible to predict whether the physiological measurement is in certain ranges (e.g., "low", "medium", or "high") to an acceptable level of accuracy.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of implementing a task complexity learning system, including: learning a model for predicting the value of a continuous task variable y based upon an input variable x; learning an encoder that encodes a continuous task variable y into an encoded task value; calculating a loss function based upon the predicted value of y output by the model and the encoded task value output by the encoder; and calculating a distortion function based upon the input continuous task variable y and the encoded task value, wherein learning the model and learning the encoder includes minimizing an objective function based upon a hyperparameter $\lambda$, the loss function, and the distortion function for a set of input training data including x, y pairs.

Various embodiments are described, wherein the objective function $J(\eta, \theta)$ is defined as: $J(\eta, \theta)=\Sigma_{i=1}^{N}[l(f(x_i; \eta), Q(y_i; \theta))+\lambda d(Q(y_i; \theta), y_i)]$ where $\eta$ are learned parameters of the model $f(x_i; \eta)$, $\theta$ are the learned parameters of the encoding function $Q(y_i; \theta)$, $(x_i, y_i)$ are training data, N is the number of training data elements, l is the loss function, d is the distortion function, and $\lambda$ is the hyperparameter.

Various embodiments are described, further including presenting a user interface that plots the model accuracy versus task distortion for a plurality of different values of the hyperparameter $\lambda$.

Various embodiments are described, further including determining and presenting a Pareto frontier based upon plot of model accuracy versus task distortion.

Various embodiments are described, further including: receiving by the user interface a user input selecting a point in the plot associated with a specific value of the hyperparameter $\lambda$; and implementing a task predictor based upon the model and encoding function associated with the hyperparameter $\lambda$.

Various embodiments are described, further including presenting a user interface that plots the predicted task versus the actual task value for input data based upon the model and the encoder.

Further various embodiments relate to a task complexity learning system, including: a machine learning model configured to predict the values of a continuous task variable y based upon an input variable x; a machine learning encoder configured to encode a continuous task variable y into and encoded task value; a loss function configured to calculate a loss based upon the predicted value of y output by the model and the encoded task value output by the encoder; and a distortion function configured to calculate the distortion based upon the input continuous task variable y and the encoded task value, wherein the model and the encoder are trained by minimizing an objective function based upon a hyperparameter $\lambda$, the loss function, and the distortion function for a set of input training data including x, y pairs.

Various embodiments are described, wherein the objective function $J(\eta, \theta)$ is defined as: $J(\eta, \theta)=\Sigma_{i=1}^{N}[l(f(x_i; \eta), Q(y_i; \theta))+\lambda d(Q(y_i; \theta), y_i)]$ where $\eta$ are learned parameters of the model $f(x_i; \eta)$, $\theta$ are the learned parameters of the encoding function $Q(y_i; \theta)$, $(x_i, y_i)$ are training data, N is the number of training data elements, l is the loss function, d is the distortion function, and $\lambda$ is the hyperparameter.

Various embodiments are described, further including a user interface configured to plot the model accuracy versus task distortion for a plurality of different values of the hyperparameter $\lambda$.

Various embodiments are described, wherein the user interface is configured to determine and present a Pareto frontier based upon plot of model accuracy versus task distortion.

Various embodiments are described, wherein the user interface is configured to receive a user input selecting a point in the plot associated with a specific value of the hyperparameter $\lambda$; and further comprising a task predictor based upon the model and encoding function associated with the hyperparameter $\lambda$.

Various embodiments are described, further including a user interface configured to plot the predicted task versus the actual task value for input data based upon the model and the encoder.

Further various embodiments relate to a non-transitory machine-readable storage medium encoded with instructions for implementing a task complexity learning system, including: instructions for learning a model for predicting the value of a continuous task variable y based upon an input variable x; instructions for learning an encoder that encodes a continuous task variable y into an encoded task value; instructions for calculating a loss function based upon the predicted value of y output by the model and the encoded task value output by the encoder; and instructions for calculating a distortion function based upon the input continuous task variable y and the encoded task value, wherein learning the model and learning the encoder includes minimizing an objective function based upon a hyperparameter $\lambda$, the loss function, and the distortion function for a set of input training data including x, y pairs.

Various embodiments are described, wherein the objective function $J(\eta, \theta)$ is defined as: $J(\eta, \theta)=\Sigma_{i=1}^{N}[l(f(x_i; \eta), Q(y_i; \theta))+\lambda d(Q(y_i; \theta), y_i)]$ where $\eta$ are learned parameters of the model $f(x_i; \eta)$, $\theta$ are the learned parameters of the encoding function $Q(y_i; \theta)$, $(x_i, y_i)$ are training data, N is the number of training data elements, l is the loss function, d is the distortion function, and $\lambda$ is the hyperparameter.

Various embodiments are described, further including instructions for presenting a user interface that plots the model accuracy versus task distortion for a plurality of different values of the hyperparameter $\lambda$.

Various embodiments are described, further including instructions for determining and presenting a Pareto frontier based upon plot of model accuracy versus task distortion.

Various embodiments are described, further including: instructions for receiving by the user interface a user input selecting a point in the plot associated with a specific value of the hyperparameter $\lambda$; and instructions for implementing a task predictor based upon the model and encoding function associated with the hyperparameter $\lambda$.

Various embodiments are described, further including instructions for presenting a user interface that plots the predicted task versus the actual task value for input data based upon the model and the encoder.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
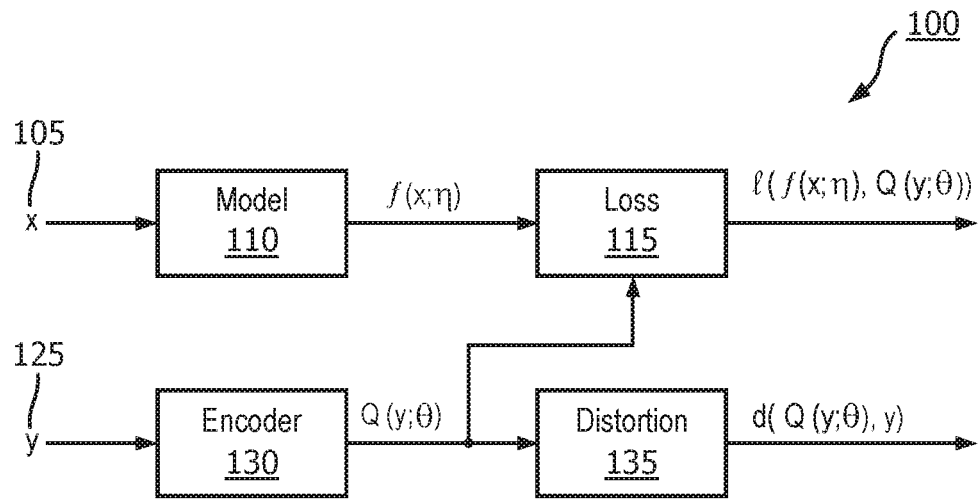
FIG. 1 illustrates a network architecture of a task complexity learning system.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Although the prediction problem of estimating a range the predicted value lies in has been simplified as suggested above, this new predictive model may still have clinical value in practice and be suitable for commercialization. The embodiments described herein implement a novel learning framework to automatically identify candidate simplified tasks that achieve a certain level of accuracy when attempts at the original task fail.

For example, suppose a model is needed that predicts a patient's hospital discharge time from features extracted from the patient's state (e.g., vitals, labs, past procedures, etc.). Optimizing for the model's parameters is typically achieved by supervised learning on a training dataset including patients' state data during various points of their hospital stays along with a target variable indicating the patients' remaining length of hospital stay (e.g., in units of minutes). Because the target variable is continuous-valued, a regression model of some kind is most appropriate, resulting in a model that takes as input patient state data and outputs a predicted hospital discharge time by adding the model's predicted remaining length of stay to the current time.

For the sake of argument, suppose that, unbeknownst to the data scientist training the model that predicts a patient's hospital discharge time, that a patient's state data is predictive of hospital discharge up to the resolution of a day. This could easily be the case in reality, because external factors that are not available to the model, including hospital workflow and nurse staffing, may factor heavily into whether a patient is discharged in the morning, afternoon, or evening of a given day. Given this limitation, we'd expect any regression model trained on these data to have significant error-bars (e.g., on the order of hours). If this model were commercialized and released to a hospital, clinicians may be hesitant to trust and adopt it due to the large error bars (e.g., predicting a hospital discharge of 10:26 am when the true discharge is 6:30 pm, with an error of 8+ hours may be perceived poorly). The problem here is that offering minute-level resolution of hospital discharge implies a certain level of precision that may not be supported by the data, and as a result, large errors hinder the perceived credibility of the model by clinicians.

In contrast, had the data scientist known of this data limitation, they may have instead trained a model that produces predictions up to the day (e.g., the patient will be discharged "Today" instead of "at 10:26 am"). Such a model may still be very useful in practice to the clinician, and may be perceived to be much more accurate (because a discharge prediction of "Today" is still "correct" when the patient is discharged at 6:30 pm). Thus, based on an understanding of the data limitations, the target (task) is appropriately simplified from minute-level predictions to day-level predictions in order to improve overall perceived model accuracy.

The challenge, of course, is that the appropriate resolution of the target variable will not be known a-priori in general or prior domain knowledge might be unclear, that is for example, there may be a sense that a hospital discharge may be predicted somewhere between 12-hour and 48-hour increments. Thus, a desired strategy would be to allow the data to dictate the resolution of the target variable.

Such a data-driven strategy, however, presents some challenges. In particular, the concept of task simplification may be taken to an extreme; for example, imagine a model which predicts whether a patient will be discharged this year or next year. Although such a model will probably be very accurate, it will not be very useful in practice. Thus, varying the difficulty of the task usually results in a trade-off between the accuracy of the resulting model and its usefulness.

The embodiments described herein implement a framework to automatically learn the appropriate resolution of the target variable from training data. As opposed to learning a single model, it learns optimal models as a function of task difficulty, which allows for the trade-off between accuracy and usefulness to be better understood and characterized by the data scientist. In doing so, it also allows for the model's output resolution to be appropriately calibrated based on use case constraints, for example, to learn the best model that achieves a certain baseline accuracy and that maintains a certain prediction resolution.

Along with the description above, a number of generic cases are highlighted in which the invention is useful. To do this, some notation is introduced: let x denote a set of features (predictor variables) and y a target task to be predicted from x. The method learns an encoding function $Q(y; \theta)$ that produces a new target task based on learnable parameters $\theta$. Conceptually, the method may be seen as modelling the conditional probability of y given x, denoted $p(y|x)$, via the following:

$$p(y|x)=p(y|Q(y;\theta))p(Q(y;\theta)|x)$$

The conditional distribution above decomposes into two terms:
1) $p(Q(y; \theta)|x)$ that models the power of the input features in predicting a new target task $Q(y; \theta)$. Intuitively, it is expected that a predictive model based on x to be more accurate in predicting $Q(y; \theta)$ as the variance of the conditional distribution $p(Q(y; \theta)|x)$ decreases; and
2) $p(y|Q(y; \theta))$ that models the residual uncertainty in the original target task y given the new task $Q(y; \theta)$. As this distribution becomes more diffuse, that is it has a higher variance, information about the original task y is progressively lost.

Thus, there is a tradeoff between the variance contained in $p(Q(y; \theta)|x)$ indicating the accuracy of the predictive model and the variance contained in $p(y|Q(y; \theta))$ indicating how much the task has been simplified and has deviated from y. As stated above, the embodiments described herein allow exploring this tradeoff for different encoders $Q(y; \theta)$.

Given this, it is envisioned that the embodiments described herein will be useful in the following settings: presence of label noise; model misspecification; and limited data.

Label noise may occur when y is a categorical variable with high cardinality and there is the potential for the given labels in a training dataset to differ from the ground truth labels. For example, an expert may be very good at labelling patients belonging to coarse-level disease states (e.g., cardiovascular disease vs respiratory disease states), but sub-labelling within these disease states may be more error prone. Alternatively, labels may be derived from an electronic medical record (EMR) charting system and, due to variability in charting software/workflow between hospitals, the same condition may be represented differently in the database. The extracted labels then would artificially divide one condition into multiple conditions. The embodiment disclosed herein may then be used to identify clusters of categories that suppress the label noise.

Model misspecification may occur when a machine learning algorithm makes an implicit assumption about the probability distribution between x and y (e.g., in linear regression, it is often assumed that $p(y|x)$ is Gaussian). This assumption may be very wrong in practice—e.g., $p(y|x)$ is not Gaussian, but $p(Q(y; \theta)|x)$ is Gaussian for some nonlinear function $Q(y; \theta)$. Alternatively, similar to the hospital discharge example presented above, it may be that the features x are only predictive of a censored version of the target variable (e.g., predictive only of the day of discharge, but not the exact time).

When only limited data is available for training, it may be the situation that y can be estimated from x, but the true underlying model is incredibly complicated with many parameters. Because of the limited training data, the algorithm may overfit, leading to high generalization error. In these situations, it may be more appropriate to instead predict a simplified target task $Q(y; \theta)$, which may be estimated via simpler models.

The embodiment of a predictive system may include a task complexity learning algorithm and a visual interface for human feedback FIG. 1 illustrates a network architecture of a task complexity learning system. The task complexity learning system 100 includes a model $f(x; \eta)$ 110 and an encoder $Q(y; \theta)$ 130. The model $f(x; \eta)$ 110 is a model with parameters $\eta$ that takes as input the feature data x 105 and outputs a prediction. The encoder $Q(y; \theta)$ 130 outputs a new target task given an initial target task y 125 based on parameters $\theta$. In most cases, the model $f(x; \eta)$ 110 may be based on any machine learning framework (e.g., logistic regression, support vector machine (SVM), or a deep neural network), while the encoder $Q(y; \theta)$ 130 is usually a much simpler function because it takes as input only a univariate target variable.

The task complexity learning algorithm 100 optimizes for parameters $\eta$ and $\theta$ is based on balancing a weighted sum of two objectives: a loss function $l(f(x; \eta), Q(y; \theta))$ 115; and a distortion function $d(Q(y; \theta), y)$ 135. The loss function $l(f(x; \eta), Q(y; \theta))$ 115 determines the model accuracy between predictions made by model $f(x; \eta)$ 110 and the new target task $Q(y; \theta)$ from the encoder 130 and outputs a metric that quantifies the error made by the model. The distortion function $d(Q(y; \theta), y)$ 135 calculates a distortion metric indicating the difference between the original task y 125 and encoded task $Q(y; \theta)$ from the encoder 130.

Figure 2:
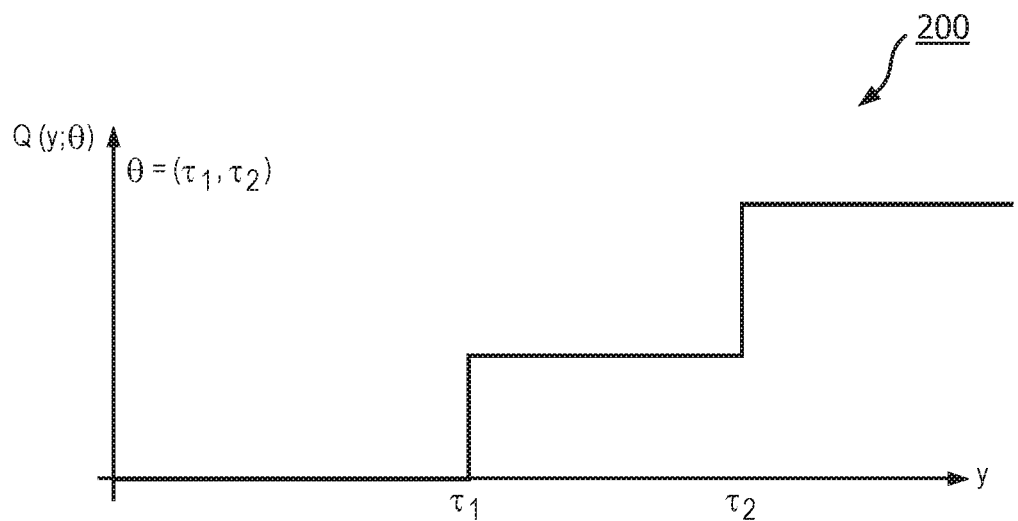
FIG. 2 illustrates an example encoding function that converts a continuous-valued target variable y to a 3-level (low, medium, high) discrete target task.

The encoder $Q(y; \theta)$ 130 will often change the range of values that the target variable can take on. For example, the original target task may be to predict a continuous-valued physiological variable y 125, but the encoder $Q(y; \theta)$ 130 maps to ordinal levels (e.g., "low", "medium", and "high"), in which case the new target task is discrete. FIG. 2 illustrates an example encoding function 200 that converts a continuous-valued target variable y to a 3-level (low, medium, high) discrete target task. The encoder parameters are given by the two thresholds separating the ordinal levels. The change in the range of values of the target task can be handled in at least two ways.

First, the simplest way to change the range of values of the target task is to modify both the predictive model $f(x; \eta)$ and loss function $l(f(x; \eta), Q(y; \theta))$ to accommodate discrete target tasks. In this case, $f(x; \eta)$ is a multi-class classifier and the loss function compares categorical predictions made by the model to the true category defined by $Q(y; \theta)$.

The downside the first approach is that in most realistic scenarios, the data scientist has already devoted time to developing a model architecture that predicts the original continuous-valued target task y. This solution leverages that existing work and accounts for the change in target task by only modifying the loss function. This allows for the existing model architecture for f(x; η) to remain fixed, which is particularly useful when modifying the model architecture may be difficult or impractical.

Figure 3:
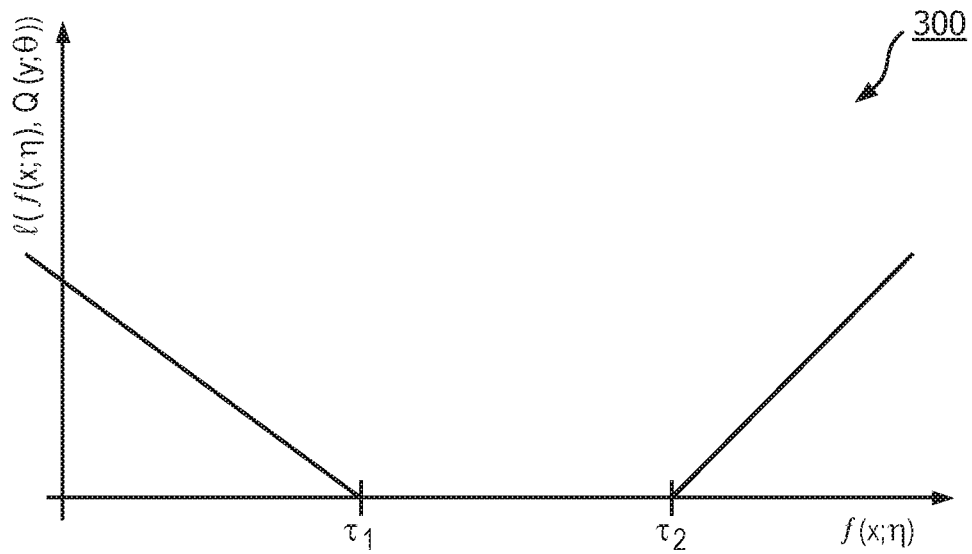
FIG. 3 illustrates an example loss function that compares continuous output predictions made by the model to the encoded target task.

In this solution, the model f(x; η) continues to produce continuous-valued regression outputs and the loss function compares that output to the discrete category produced by Q(y; θ). The loss function only registers a non-zero error if the continuous output prediction made by the model does not fall into the same category as y. This can be achieved, for example, by using a hinge loss function, but other loss functions may be used as well. FIG. 3 illustrates an example loss function that compares continuous output predictions made by the model to the encoded target task. In this case, it is assumed that Q(y; θ)=1, when $\tau_1 \leq y \leq \tau_2$. The loss function 300 only registers a non-zero error if the model prediction falls outside the ($\tau_1$, $\tau_2$) range Ideally, the distortion metric will quantify how much clinical value the encoded target task Q(y; θ) brings. There are many possibilities to encode this information, including measuring the information contained in Q(y; θ) about the original target task y. This may be measured by standard methods, for example calculating the mutual information (MI), i.e., MI(Q(y; θ), y). Because it is desired to maximize this quantity, the distortion metric is set equal to the negative of mutual information, d(Q(y; θ), y)=−MI(Q(y; θ), y).

Other embodiments allow other mechanisms for the distortion metric to quantify clinical value of Q(y; θ) when additional side information is available. Returning to the example in which the encoder Q(y; θ) quantizes a continuous physiological target variable into a set of ordinal levels ("low", "medium", and "high"), a clinician may provide ranges on the boundaries between low/medium and medium/high that would be clinically useful. This side information may be incorporated into the distortion function to compare the extent to which the encoded target task Q(y; θ) matches the ranges specified by the clinician.

Training the algorithm amounts to learning the model parameters η and encoding parameters θ from a set of labelled data ($x_1$, $y_1$), ($x_2$, $y_2$), . . . , ($x_N$, $y_N$) that minimize a balance of the loss function l(f(x; η), Q(y; θ)) and distortion function d(Q(y; θ), y). This may be achieved by incorporating a hyperparameter λ, so that the total objective function is to minimize:

$$J(\eta, \theta) = \sum_{i=1}^{N} [l(f(x_i; \eta), Q(y_i; \theta)) + \lambda d(Q(y_i; \theta), y_i)]$$

For a particular setting of λ, the above objective function may be minimized over the parameters η and θ by, for example, gradient descent. This results in a (model, task) pair, (f(x; η*), Q(y; θ*)), that is optimal for a given tradeoff between model accuracy and task distortion (specified by λ). In practice, the above would be minimized for multiple settings of (e.g., over a grid of M distinct values), which results in a set of M (model, task) pairs:

$$\begin{bmatrix} (f_1(x; \eta_1^*), Q_1(y; \theta_1^*)) \\ (f_2(x; \eta_2^*), Q_2(y; \theta_2^*)) \\ \ldots \\ (f_M(x; \eta_M^*), Q_M(y; \theta_M^*)) \end{bmatrix}$$

Each (model, task) pair above is optimal for a given λ parameter setting, and therefore is optimal for a different tradeoff between model accuracy and task distortion. For example, when λ is very large in magnitude, the objective heavily weights the distortion, so it is expected that the encoded task closely resembles y, but the model prediction accuracy may be low. In contrast, when the parameter λ is small in magnitude, the objective more heavily weights the model accuracy, so it is expected that the model accuracy may be high, but the encoded task may not resemble the original task y at all.

Figure 4:
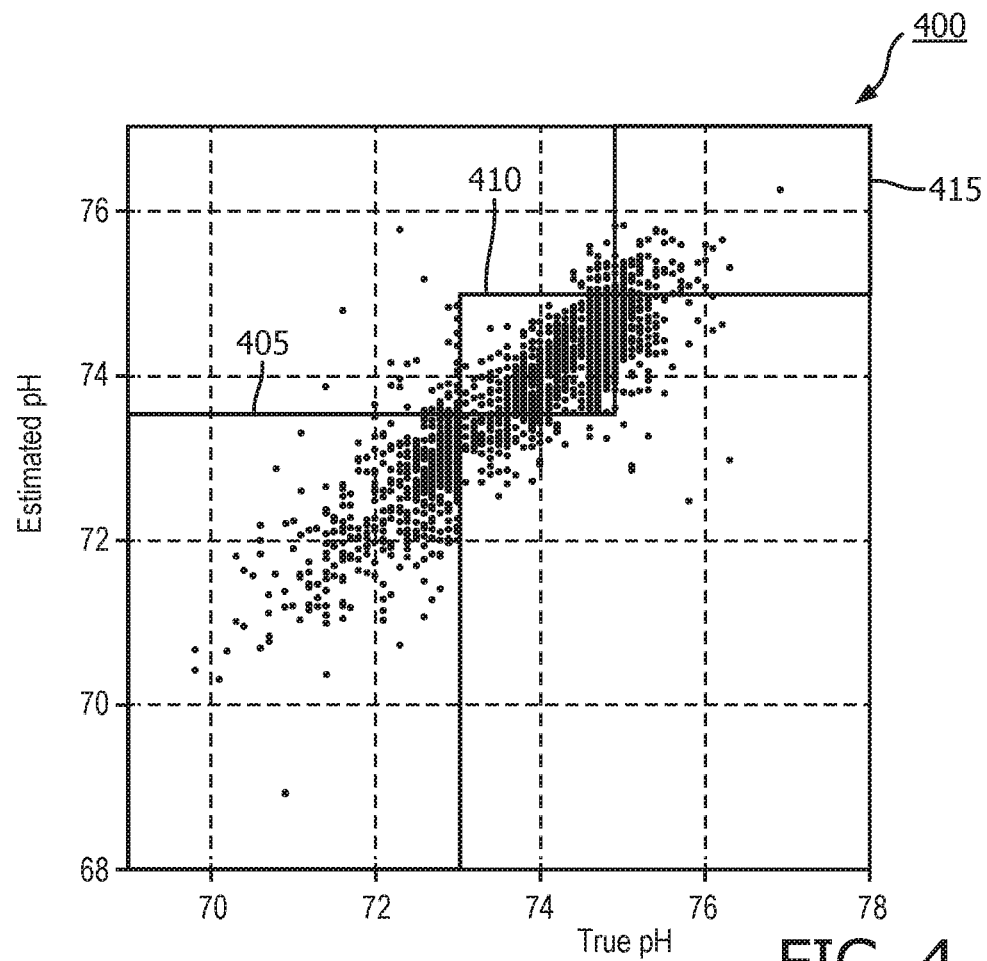
FIG. 4 illustrates a plot of true pH versus predicted pH, along with the regions of low, medium, and high pH defined by the task encoder.

An example application of the embodiment described herein is to provide a user interface that explores and interrogates clinically useful prediction tasks related to an initial target task. The example use case is predicting a patient's blood pH from other physiological measurements of the patient. Thus, the initial target task y is the blood pH, while the encoded target task is ordinal ranges for blood pH (e.g., "low"<7.2, "medium"=7.2-7.4, "high">7.4). FIG. 4 illustrates a plot 400 of true pH versus predicted pH, along with the regions of low, medium, and high pH defined by the task encoder. The regions 405, 410, 415 define the regions where the predicted value is within correct ordinal range, accordingly, the predictive model only makes an error when its prediction is outside all of the regions 405, 410, 415.

Figure 5:
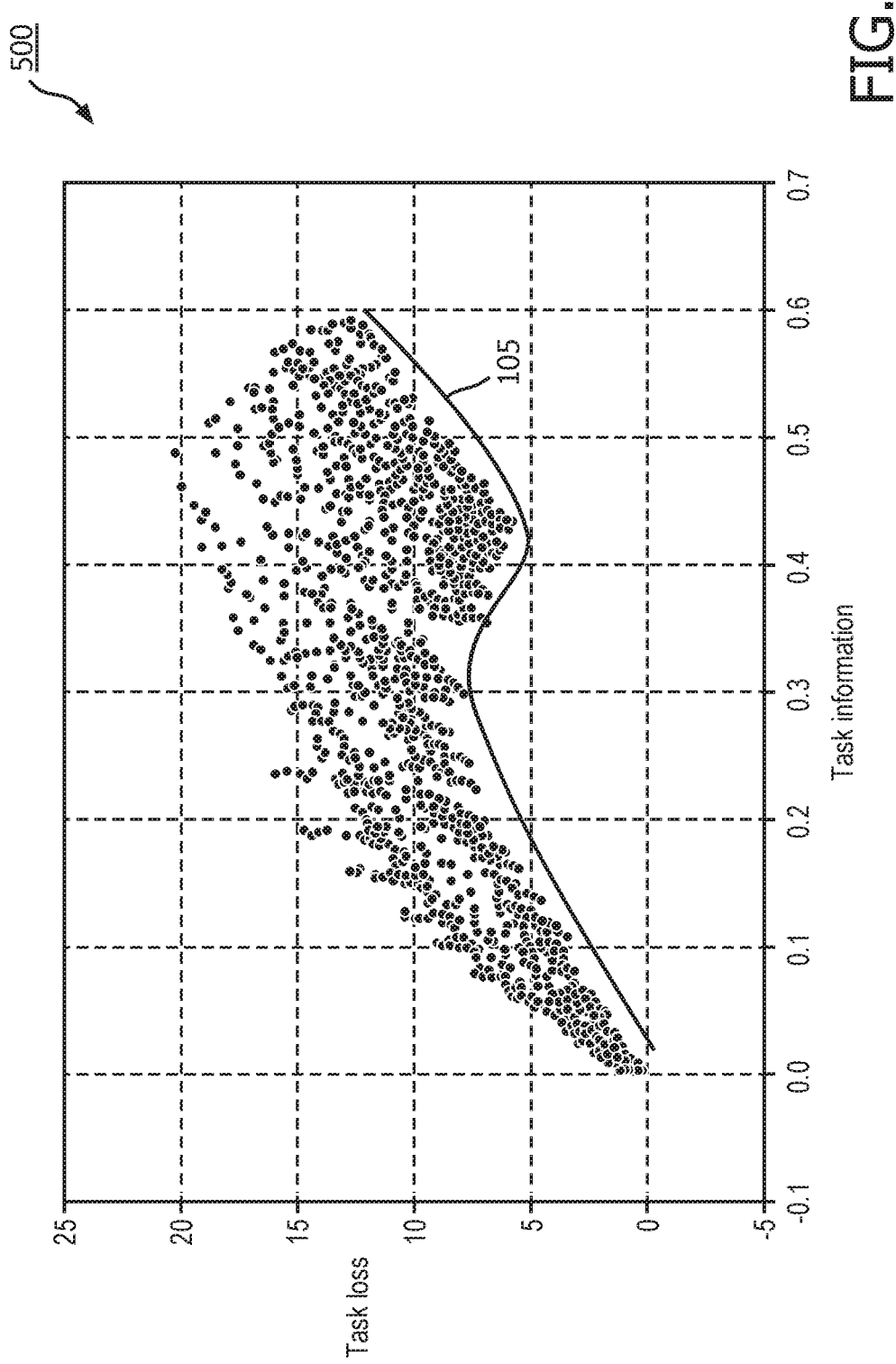
FIG. 5 illustrates a visualization space of a user interface that plots each (model, task) pair in a two-dimensional space that contrasts model accuracy or task loss against task distortion or task information.

Next it is assumed that the learning algorithm according to the previous section has been trained for M values of the tradeoff parameter λ, resulting in M sets of (model, task) pairs. Each (model, task) pair optimizes a particular tradeoff between model accuracy and task distortion, and the post-processing task involving a user is to identify the best (model, task) pair according to a set of specific use-case constraints. To assist in this task, a user interface may be provided that visualizes the set of M (model, task) pairs in a two-dimensional space that contrasts the model accuracy with task distortion. FIG. 5 illustrates a visualization space of a user interface that plots each (model, task) pair in a two-dimensional space that contrasts model accuracy or task loss (y-axis) against task distortion or task information (x-axis). Optimal (model, task) pairs lie along the Pareto Frontier 505. The user may then extract those (model, task) pairs and evaluate them on specific use case criteria (e.g., minimum standard of model accuracy and clinical value of the encoded task). This evaluation may result in the selection of a specific model and encoding function for use in predicting a value x and the associated task y. This may be automated by selecting a certain number or percentage of all the pairs that are closest to the Pareto Frontier 505. Also, all pairs that are within a certain distance of the Pareto Frontier 505 may be selected. The certain distance may be a fixed value or a value that may be selected by the user.

The embodiments described herein solve the technological problem of selecting ordinal ranges for predicted data from prediction models. The embodiments allow for a tradeoff to be made between model accuracy and task distortion. An interactive user interface may be used to help a user in determining which specific predictive model and encoding function to use. This helps to select reasonable and meaningful ordinal ranges for the predicted data that leads to user confidence in the predictive model.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above including implementing the predictive model, the encoding function, and the learning and optimization phase for the system.

Further such embodiments may be implemented on multiprocessor computer systems, distributed computer systems, and cloud computing systems. For example, the embodiments may be implemented as software on a server, a specific computer, on a cloud computing, or other computing platform. For example, the generation of optimal models for different values of $\lambda$ are done independently, and may be implemented on different nodes in a cloud or distributed computer system.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of implementing a task complexity learning system, comprising:
   learning a model for predicting the value of a continuous task variable y based upon an input variable x;
   learning an encoder that encodes a continuous task variable y into an encoded task value;
   calculating a loss function based upon the predicted value of y output by the model and the encoded task value output by the encoder; and
   calculating a distortion function based upon the input continuous task variable y and the encoded task value,
   wherein learning the model and learning the encoder includes minimizing an objective function based upon a hyperparameter $\lambda$, the loss function, and the distortion function for a set of input training data including x, y pairs.

2. The method of claim 1, wherein the objective function $J(\eta, \theta)$ is defined as:

$$J(\eta, \theta) = \sum_{i=1}^{N} [l(f(x_i; \eta), Q(y_i; \theta)) + \lambda d(Q(y_i; \theta), y_i)]$$

where $\eta$ are learned parameters of the model $f(x_i; \eta)$, $\theta$ are the learned parameters of the encoding function $Q(y_i; \theta)$, $(x_i, y_i)$ are training data, N is the number of training data elements, l is the loss function, d is the distortion function, and $\lambda$ is the hyperparameter.

3. The method of claim 1, further comprising presenting a user interface that plots the model accuracy versus task distortion for a plurality of different values of the hyperparameter $\lambda$.

4. The method of claim 3, further comprising determining and presenting a Pareto frontier based upon plot of model accuracy versus task distortion.

5. The method of claim 4, further comprising:
   receiving by the user interface a user input selecting a point in the plot associated with a specific value of the hyperparameter $\lambda$; and
   implementing a task predictor based upon the model and encoding function associated with the hyperparameter $\lambda$.

6. The method of claim 1, further comprising presenting a user interface that plots the predicted task versus the actual task value for input data based upon the model and the encoder.

7. A task complexity learning system, comprising a processor,
   wherein the processor comprises:
   a machine learning model that predicts the values of a continuous task variable y based upon an input variable x;
   a machine learning encoder that encodes a continuous task variable y into and encoded task value;
   a loss function that calculates a loss based upon the predicted value of y output by the model and the encoded task value output by the encoder; and
   a distortion function that calculates the distortion based upon the input continuous task variable y and the encoded task value,
   wherein the model and the encoder are trained by minimizing an objective function based upon a hyperparameter $\lambda$, the loss function, and the distortion function for a set of input training data including x, y pairs.

8. The system of claim 7, wherein the objective function $J(\eta, \theta)$ is defined as:

$$J(\eta, \theta) = \sum_{i=1}^{N} [l(f(x_i; \eta), Q(y_i; \theta)) + \lambda d(Q(y_i; \theta), y_i)]$$

where $\eta$ are learned parameters of the model $f(x_i; \eta)$, $\theta$ are the learned parameters of the encoding function $Q(y_i; \theta)$, $(x_i, y_i)$ are training data, N is the number of training data elements, l is the loss function, d is the distortion function, and $\lambda$ is the hyperparameter.

9. The system of claim 7, further comprising a user interface configured to plot the model accuracy versus task distortion for a plurality of different values of the hyperparameter λ.

10. The system of claim 9, wherein the user interface is configured to determine and present a Pareto frontier based upon plot of model accuracy versus task distortion.

11. The system of claim 10, wherein the user interface is configured to receive a user input selecting a point in the plot associated with a specific value of the hyperparameter λ; and further comprising a task predictor based upon the model and encoding function associated with the hyperparameter λ.

12. The system of claim 7, further comprising a user interface configured to plot the predicted task versus the actual task value for input data based upon the model and the encoder.

13. A non-transitory machine-readable storage medium encoded with instructions for implementing a task complexity learning system, comprising:
  instructions for learning a model for predicting the value of a continuous task variable y based upon an input variable x;
  instructions for learning an encoder that encodes a continuous task variable y into an encoded task value;
  instructions for calculating a loss function based upon the predicted value of y output by the model and the encoded task value output by the encoder; and
  instructions for calculating a distortion function based upon the input continuous task variable y and the encoded task value,
  wherein learning the model and learning the encoder includes minimizing an objective function based upon a hyperparameter λ, the loss function, and the distortion function for a set of input training data including x, y pairs.

14. The non-transitory machine-readable storage medium of claim 13, wherein the objective function J(η, θ) is defined as:

$$J(\eta, \theta) = \sum_{i=1}^{N} [l(f(x_i; \eta), Q(y_i; \theta)) + \lambda d(Q(y_i; \theta), y_i)]$$

where η are learned parameters of the model $f(x_i; \eta)$, θ are the learned parameters of the encoding function $Q(y_i; \theta)$, $(x_i, y_i)$ are training data, N is the number of training data elements, l is the loss function, d is the distortion function, and λ is the hyperparameter.

15. The non-transitory machine-readable storage medium of claim 13, further comprising instructions for presenting a user interface that plots the model accuracy versus task distortion for a plurality of different values of the hyperparameter λ.

16. The non-transitory machine-readable storage medium of claim 15, further comprising instructions for determining and presenting a Pareto frontier based upon plot of model accuracy versus task distortion.

17. The non-transitory machine-readable storage medium of claim 16, further comprising:
  instructions for receiving by the user interface a user input selecting a point in the plot associated with a specific value of the hyperparameter λ; and
  instructions for implementing a task predictor based upon the model and encoding function associated with the hyperparameter λ.

* * * * *